United States Patent
Jung et al.

(10) Patent No.: US 7,676,607 B2
(45) Date of Patent: Mar. 9, 2010

(54) HARDWARE ACCELERATION APPARATUS FOR ISCSI TARGET SYSTEM USING TOE AND METHOD FOR PERFORMING READ/WRITE COMMAND USING THE APPARATUS

(75) Inventors: Byung Kwon Jung, Daejeon (KR); Young Kyun Kim, Daejeon (KR); June Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 325 days.

(21) Appl. No.: 11/636,046

(22) Filed: Dec. 8, 2006

(65) Prior Publication Data
US 2007/0147390 A1 Jun. 28, 2007

(30) Foreign Application Priority Data
Dec. 8, 2005 (KR) .................. 10-2005-0119578
Apr. 27, 2006 (KR) .................. 10-2006-0038330

(51) Int. Cl.
*G06F 3/00* (2006.01)
*G06F 13/00* (2006.01)

(52) U.S. Cl. .................. 710/33; 710/5; 710/58
(58) Field of Classification Search ............ None
See application file for complete search history.

(56) References Cited

U.S. PATENT DOCUMENTS

| | | | |
|---|---|---|---|
| 2001/0056520 A1* | 12/2001 | McBryde et al. | 711/114 |
| 2003/0200284 A1* | 10/2003 | Philbrick et al. | 709/219 |
| 2004/0062267 A1 | 4/2004 | Minami et al. | |
| 2004/0133695 A1* | 7/2004 | Kim et al. | 709/231 |
| 2004/0174893 A1 | 9/2004 | Saito | |

* cited by examiner

*Primary Examiner*—Tariq R. Hafiz
*Assistant Examiner*—Scott Sun
(74) *Attorney, Agent, or Firm*—Ladas & Parry LLP

(57) ABSTRACT

Provided is a hardware acceleration apparatus for an iSCSI target system including a local memory storing data transmitted between a disk storage device and a network system, a TOE controller performing TCP/IP stack offloading on a TCP/IP packet of data stored in the local memory, a network controller allowing data offloaded from the local memory to be transmitted to the network system using an iSCSI protocol or allowing data received from the network system to be stored in the local memory, and a disk controller storing and withdrawing data between the disk storage device and the local memory.

13 Claims, 5 Drawing Sheets

HARDWARE ACCELERATION APPARATUS FOR ISCSI TARGET SYSTEM USING TOE AND METHOD FOR PERFORMING READ/WRITE COMMAND USING THE APPARATUS

CROSS-REFERENCE TO RELATED PATENT APPLICATIONS

This application claims the benefit of Korean Patent Application No. 10-2005-0119578, filed on Dec. 8, 2005 and Korean Patent Application No. 10-2006-0038330, filed on Apr. 27, 2006, in the Korean Intellectual Property Office, the disclosures of which are incorporated herein in their entirety by reference.

BACKGROUND OF THE INVENTION

1. Field of the Invention

The present invention relates to a hardware acceleration apparatus for a storage system connected to a network and a method for handling data using the apparatus, and more particularly, to a hardware acceleration apparatus for an iSCSI target system using a TOE (TCP/IP offload engine) and a method for performing read/write command using the apparatus.

2. Description of the Related Art

With the rapid development of computer systems, the amount of data stored on servers has increased exponentially. Accordingly, demand for improvements in performance of a data storage device has continuously grown. Thus, since there is a limit in storing data only in a storage device that is directly connected to a server, a variety of storage device connection methods through a network have been devised.

The connection method between a storage device and a server using a network that is currently widely used includes an NFS (network file system), an NAS (network attached storage), and an SAN (storage area network).

The NFS is a method for connecting a storage device to a network that has been previously used in which data is stored in unit of files through a TCP (transmission control protocol) connection between general servers. However, according to this method, the performance of transmission is deteriorated because a load increases in a file system.

The NAS is a method for storing data in units of files through the TCP connection like the NFS. However, the NAS uses dedicated hardware to decrease a load on the server. In this method, nevertheless, the improvement of the storage performance for a target system is restricted by a load on the file system due to the limit of the file unit storage method.

Unlike the NAS or NFS, the SAN is a method which improves the I/O performance by reducing a load on a storage device as the storage device and the server are connected through a dedicated network and the load on a file system is handled at the side of the server through the storage of data in unit of blocks, not files. However, this method has drawbacks in that the construction of a dedicated network incurs high costs and the establishment of a connection network throughout a wide range is difficult.

Another approach is a network protocol. In particular, there have been various attempts to use an IP network which is simple and relatively inexpensive, is capable of routing, and has no limit in distance. An example is an iSCSI (internet small computer system interface) protocol that is a method for transceiving data using an iSCSI protocol arranged on a TCP/IP protocol over the Internet.

However, since the iSCSI protocol is connected through an IP network, it causes a great amount of load during the processing of the TCP/IP protocol. If the load is appropriately controlled, the iSCSI protocol may be useful, which will be discussed below over relevant prior arts.

First, U.S. Patent Publication No. 2004-0174893 filed on Feb. 23, 2004, published on Sep. 9, 2004, invented by Yoshohiro Saito and assigned to NEC Corporation, discloses an iSCSI device and a communication control method thereof. According to this invention, incoming packets are classified using a discriminating network controller for an iSCSI target system and two operation processors perform distributed processes for cases of an iSCSI packet and a non-iSCSI packet so that, when a large amount of general packets are incoming, the iSCSI I/O performance is not degraded and thus performance is improved.

In the published invention, since the two operation processors for processing network protocols are provided, even when the amount of IP traffic increases, the iSCSI I/O processing performance is not degraded. However, the invention does not teach any method concerning additional TCP/IP protocol processing to reduce the load on a CPU that is another important part of the system.

Next, U.S. Patent Publication No. 2004-0062267 filed on Jun. 5, 2003, published on Apr. 1, 2004, and invented by John Shigeto Minami et al., discloses a gigabit Ethernet adaptor supporting iSCSI and IPSec protocol. In this published invention, a gigabit Ethernet controller includes a method for processing TCP/IP protocols with an operation processor, a memory, and a program added. In particular, a protocol such as iSCSI or IPSec is processed by a built-in operation processor and a built-in memory so that performance is improved.

The published invention is related to an intelligent network adaptor and a processing structure thereof which improves performance by executing a protocol processing step using a general processor included in a network controller to improve performance. However, when the TCP/IP protocol is processed using a general operation processor and program, performance is degraded compared to the case when an dedicated TOE controller is used. If programs for processing all protocols suggested in the above invention are included in an Ethernet controller, the performance may be further degraded.

Also, for use in an iSCSI target system, the optimization of a data transfer path is no less important than the protocol processing step. The use of a general operation processor as in the published invention is ineffective compared to the optimization of a path using the dedicated TOE controller, the network controller, a disk controller, and an I/O operation processor.

SUMMARY OF THE INVENTION

To solve the above and/or other problems, the present invention provides a hardware acceleration apparatus configured by integrating memory and specialized controllers and memories of a TOE (TCP/IP offload engine) controller, an I/O operation processor, a disk controller, and a network controller. In particular, the above hardware acceleration apparatus effectively processes a read/write command of an iSCSI protocol by TCP/IP offloading of data transmitted and received through a network system instead of a using a main CPU.

According to an aspect of the present invention, there is provided a hardware acceleration apparatus for an iSCSI (internet small computer system interface) target system, the apparatus including: a local memory storing data transmitted between a disk storage device and a network system; a TOE (TCP/IP offload engine) controller performing offloading of a TCP/IP (transmission control protocol/internet protocol) stacked on a TCP/IP packet of data stored in the local memory; a network controller allowing data offloaded from the local memory to be transmitted to the network system using an iSCSI protocol or allowing data received from the network system to be stored in the local memory; and a disk controller storing and withdrawing data between the disk storage device and the local memory.

According to another aspect of the present invention, there is provided a method for performing a read command for an iSCSI target system, the method including: withdrawing data to be read from a disk storage device and storing the withdrawn data in a local memory; performing TCP/IP stack offloading on a TCP/IP packet of the stored data; and transmitting the offloaded data to a network system.

According to another aspect of the present invention, there is provided a method for performing a write command for an iSCSI target system, the method including: storing data received from a network system in a local memory; performing TCP/IP stack offloading on a TCP/IP packet of the stored data; and storing the offloaded data in a disk storage device.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
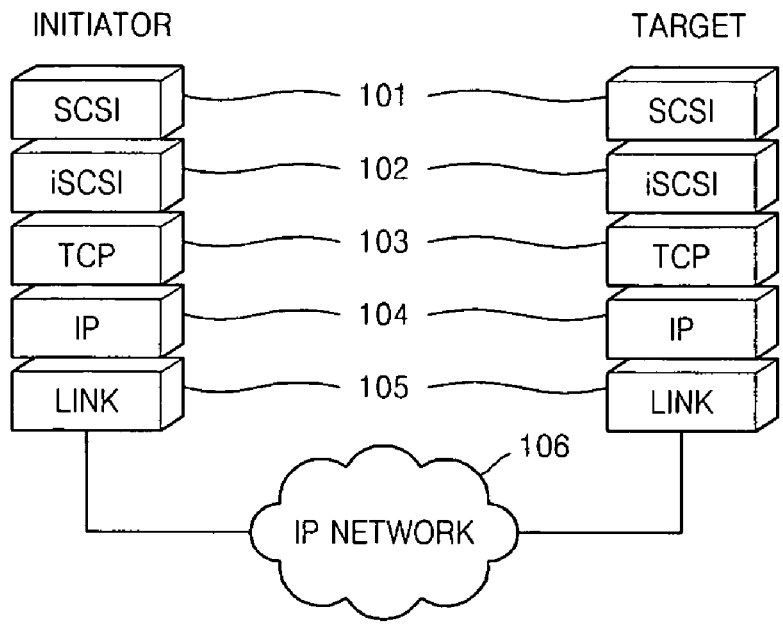
FIG. 1 is a diagram showing a layered model of an iSCSI protocol that is a basis for the present invention.

FIG. 1 is a diagram showing a layered model of an iSCSI (internet small computer system interface) protocol that is a basis for the present invention. TCP/IP (transmission control protocol/internal protocol) is a standard protocol for data transmission between computers through the Internet and consists of four layers of a data link layer, a network layer, a transport layer, and an application layer. The iSCSI protocol layer model of FIG. 1 is based on the TCP/IP layer, in which an IP layer 104 as the network layer, and a TCP layer 103 and an iSCSI protocol layer 102 on the TCP layer 103, as the transport layer, are provided on and above a data link layer 105. That is, the iSCSI protocol uses the TCP/IP protocol as a reliable method for the transmission and receiving of data in a network.

However, a storage integrate system using the iSCSI protocol requires three components. The first component is an iSCSI target system that is a storage which is the final subject of disk integration. The second component is an iSCSI network that is a general TCP/IP network 106. The third component is an iSCSI initiator (or server). Since the iSCSI protocol is basically operated through an Ethernet LAN card of a server, an iSCSI driver capable of understanding an iSCSI packet, like other drivers, is needed. In particular, this is referred to as a software initiator when the iSCSI driver only is installed on an existing LAN card for use, and a hardware initiator when a dedicated card (iSCSI HBA) performing an operation related to iSCSI is used.

Also, since the iSCSI is a standard protocol regulating the serialization of SCSI (small computer system interface) command sets with respect to TCP/IP, under the above model structure, SCSI commands received from the iSCSI initiator that is a server through the iSCSI protocol are transmitted to a target system in which the commands are encoded and transmitted with other data.

Figure 2:
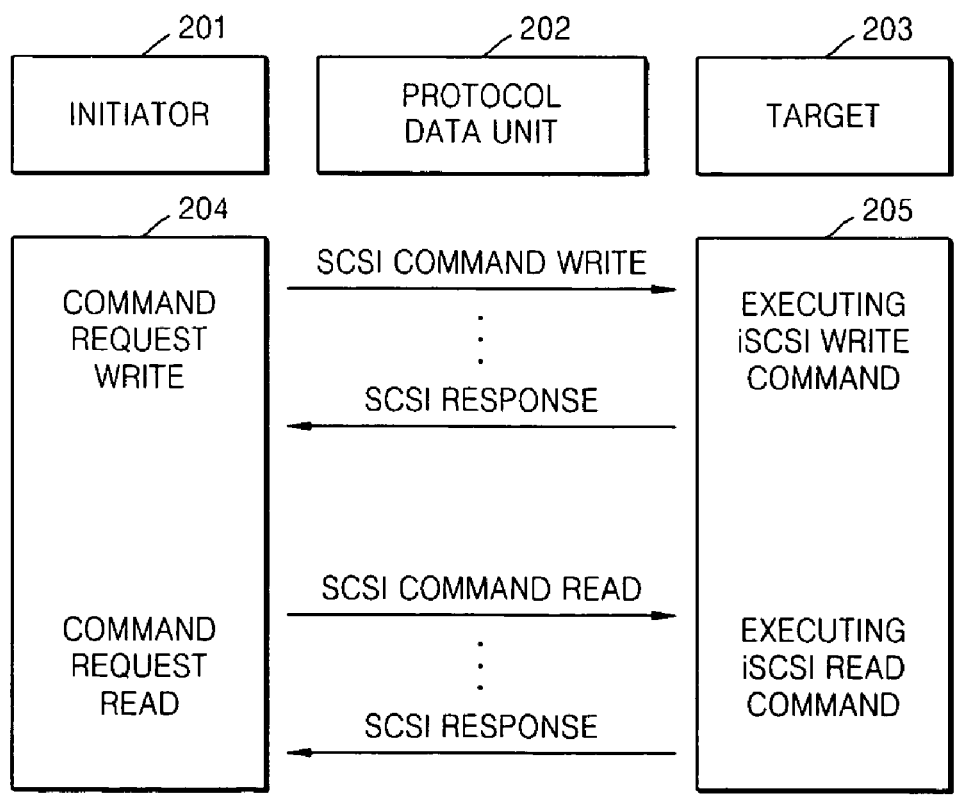
FIG. 2 is a diagram showing the flow of transmission of a read/write command through iSCSI protocol on a network according to an embodiment of the present invention.

FIG. 2 is a diagram showing the flow of transmission of a read/write command through iSCSI protocol on a network according to an embodiment of the present invention. Referring to FIG. 2, the commands in SCSI, such as read or write, are transmitted from an iSCSI initiator 201 to a target system 203, and the final response after commands are executed is transmitted from the target system 203 to the initiator 201.

This includes a data transmission process that is an object of read/write processes. In relation to the present invention, a command execution step 205 of the target system 203 with respect to a read/write command 204 is mainly discussed excluding the steps where the read/write command 204 actually arrives directly at the target system 203 through the iSCSI protocol or the target system 203 sends a final response to the initiator 201.

Figure 3:
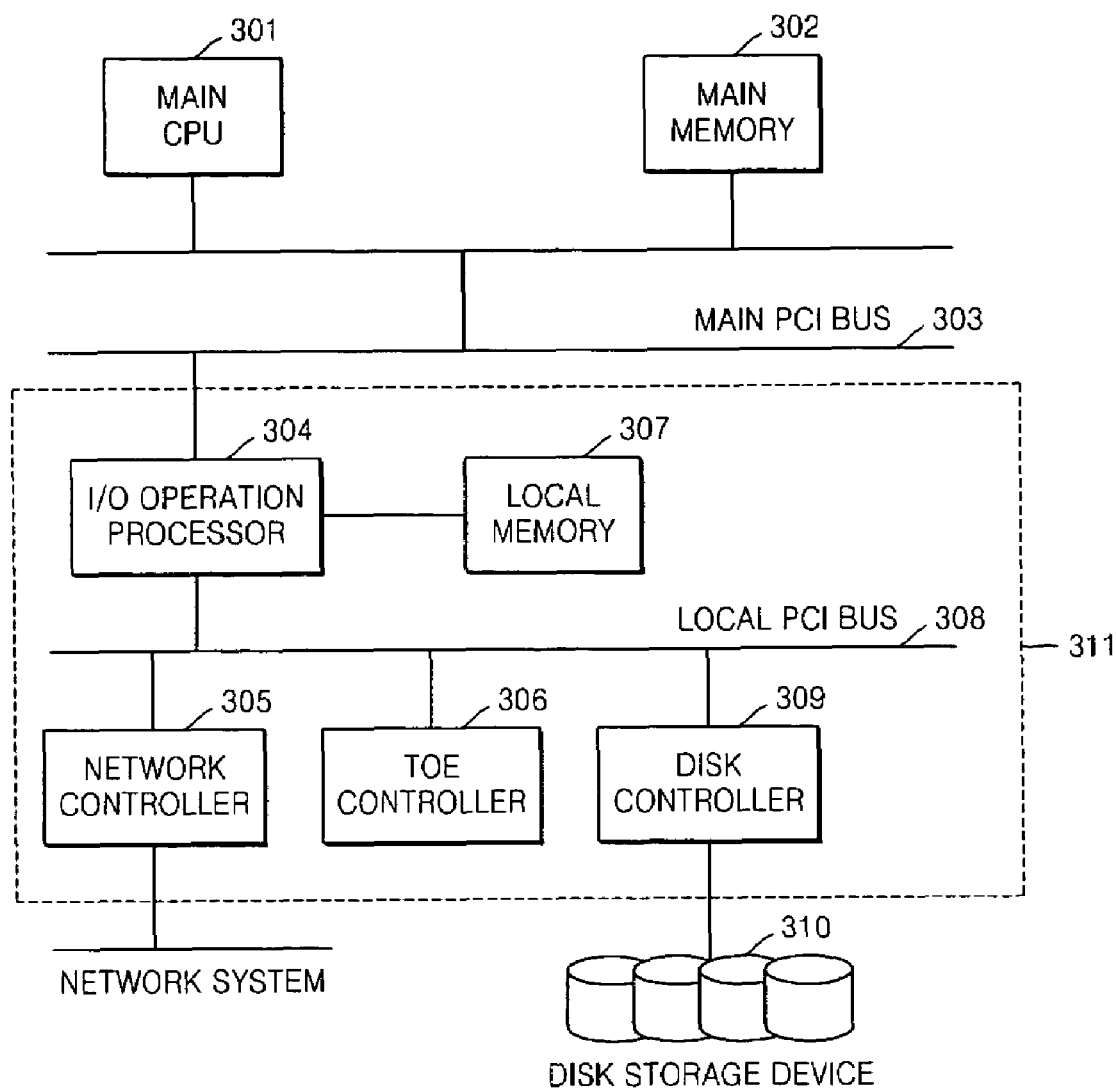
FIG. 3 is a diagram showing the configuration of a hardware acceleration apparatus for an iSCSI target system according to an embodiment of the present invention.

FIG. 3 is a diagram showing the configuration of a hardware acceleration apparatus for an iSCSI target system according to an embodiment of the present invention. FIG. 3 shows the connection state and internal structure of a hardware acceleration apparatus when the hardware acceleration apparatus according to the present invention is connected to a PCI bus of a main board.

A hardware acceleration apparatus 311 according to an embodiment of the present invention is connected to a system though a main PCI bus 303. Also, the hardware acceleration apparatus 311 is embodied as a single PCI card and internal devices are connected to one another by a local PCI bus 308.

The hardware acceleration apparatus 311 includes an I/O operation processor 304 functioning as a PCI bridge connecting the main board and the PCI bus and as a memory controller, a local memory 307 functioning as a buffer during the data I/O and used as a data storage space, a network controller 305 connected to an external network system and supporting functions of TCP/IP/UDP (user datagram protocol) checksum and scatter/gather transmission, a TOE (TCP/IP offload engine) controller 306 reducing the load on a main CPU 301 by offloading a TCP/IP stack, and a disk controller 309 performing the data I/O with respect to a disk storage device 310.

When there are a plurality of disk storage devices, the hardware acceleration apparatus 311 is used in a RAID (redundant array of inexpensive disks) system, that is, in a large capacity storage device in which several hard disks are configured as a single virtual disk for use. In particular, in such a system, it is essential to perform XOR (exclusive OR) operations to prevent redundant storage of data and redundant withdrawal of recorded data for the distributed storage and withdrawal of data.

The I/O operation processor 304 can achieve the above task by using a dedicated XOR engine. Also, when the XOR engine is used, parity checking for error detection during data transceiving between the iSCSI initiator 201 and the target system 203 of FIG. 2 can be performed at high speed.

Although in the embodiment shown in FIG. 3 the local memory 307 is connected to an internal bus of the I/O operation processor 304, data can be stored and withdrawn by directly accessing the local memory 307 through the I/O operation processor 304 by the network controller 305, the TOE controller 306, and the disk controller 309.

When the data stored in the local memory 307 when being used as a data storage space is not consecutive, a variety of methods can be used to store and withdraw the data in one complete unit of data. Among the methods, there is a gather function to directly collect data blocks for use and a scatter function to store data to be distributed in the data storage space that is not consecutive in accordance with the gather function.

In a network system, when an IP header, a TCP header, a UDP header, and a payload are not consecutively stored in a memory, the network controller 305 can transmit data using the scatter/gather functions. Also, when the checksum function is separately handled by the network controller 305 for accurate data transmission, the load on a CPU can be reduced. The checksum function is to check whether the data is changed when there is data movement on the network system. A checksum is calculated for the data to be transmitted at a transmitter's end and stored in a header. The checksum is calculated for the received data at the receiver's end and compared with the checksum stored in the header. When the data matches each other, the data is confirmed as having been correctly received. Otherwise, the received data is discarded.

The network controller 305 is dedicated hardware which can perform the scatter/gather functions to transmit data when the IP header, the TCP header, the UDP header, and the payload are not consecutively stored in the local memory 307. The network controller 305 performs a TCP/IP/UDP checksum offloading function, instead of the CPU, by handling the checksum calculation that is performed in the TCP layer, the IP layer, or a UDP layer.

A TOE will be described below in relation to the TOE controller 306. Presently, the TCP/IP is most widely used as a communication protocol between computers. However, the TCP/IP has become the largest load on a target CPU of a system. In general, a CPU cycle of 1 Hz is needed to process TCP/IP data at a rate of 1 bit/sec. Thus, at a 10/100 Mbps network speed, the CPU alone can process the TCP/IP without much difficulty. However, with the advent of the gigabyte Ethernet, the target CPU spends most of its cycles processing the TCP/IP. The TOE can greatly reduce the load on the CPU because a NIC (network interface card) handles the load on the TCP/IP packet processing instead of CPU.

Presently, the process of transmitting and receiving data according to the TCP/IP protocol is that, when data is transmitted by being sliced to fit to the MTU (maximum transmission unit) size and adding the TCP/IP header, the receiving end removes the headers and recombines the MTUs. This TCP/IP stack process creates a large load. To solve the problem, the feature of the TOE is that the processing of the TCP/IP stack is separated from the process of the CPU and handled by dedicated hardware (engine). In the present invention, the TOE controller 306 handles the processing of the TCP/IP stack. The TOE controller 306 performs the TCP/IP stack offloading instead of the main CPU 301 so that the load on the main CPU 301 in processing the TCP/IP packets is processed by dedicated hardware.

MAC (media access control) is one of the network layers existing on a physical layer and a data link layer of hardware and is responsible for physical addressing, frame synchronization, and error checking. The TOE controller 306 directly controls the MAC layer so as to directly control the physical addressing. Thus, the load on the main CPU 301 is reduced and data can be processed at high speed.

The process of reading a file from a disk apparatus in a general OS (operating system) server and transmitting the file to a network includes the steps of reading data from the disk apparatus to a buffer in a kernel, copying the data to a user memory area assigned by a user program from the buffer in the kernel, copying the data from the user memory area to a socket buffer in the kernel, and taking the content of the socket buffer to a DMA (direct memory access) by a network controller in order to transmit the same.

In the above process, copying between memories occurs two times. Since the copying between memories not only occupies a memory bandwidth but also uses the main CPU 301, when the amount of transmission is large such as during a streaming service, a CPU occupation rate dramatically increases. Also, the data is transmitted from a SCSI controller to a main memory and then from the main memory to a network interface, thus, two times or more than the actual data transmission amount occupies the bandwidth of the main PCI bus.

As a method for reducing the copying between memories, there is a zero-copy function to directly transmit data without the copying between memories by using the kernel buffer, not using the user buffer area.

For fast data transmission in the network system, the network controller 305 according to the present embodiment has the zero-copy function to directly transmit data through the local memory 307 without the steps of copying between memories that is previously described.

Figure 4:
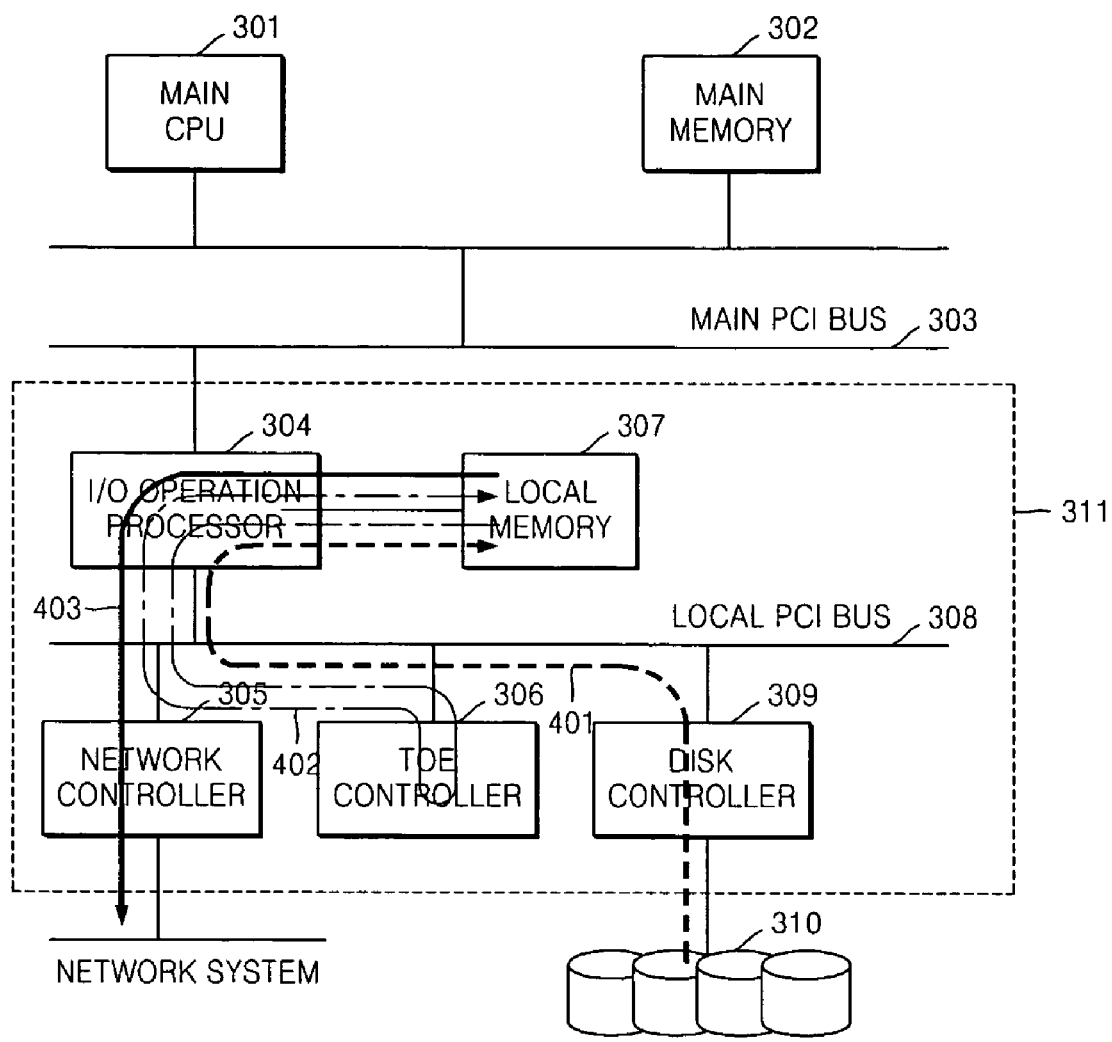
FIG. 4 is a diagram showing a data transfer path when a read command is executed on the iSCSI target system of FIG. 3.

FIG. 4 is a diagram showing a data transfer path when a read command is executed on the iSCSI target system of FIG. 3. When a read command is transmitted to the iSCSI target system, the iSCSI target system reads data from a disk storage device 310 connected thereto and transmits the read data to the network system thus completing a read command.

In detail, referring to FIG. 4, the disk controller 309, along a flow path 401, reads requested data from the disk storage device 310 and stores the read data in the local memory 307 connected to the I/O operation processor 304. Next, the TOE controller 306, along a flow path 402, reads the data stored in the local memory 307, offloads all of the TCP/IP stack without interfering with the main CPU 301, and stores the data back to the local memory 307 connected to the I/O operation processor 304. Finally, the network controller 305, along a flow path 403, transmits the offloaded data to the network system using the TCP/IP/UDP checksum function and the scatter/gather functions.

Figure 5:
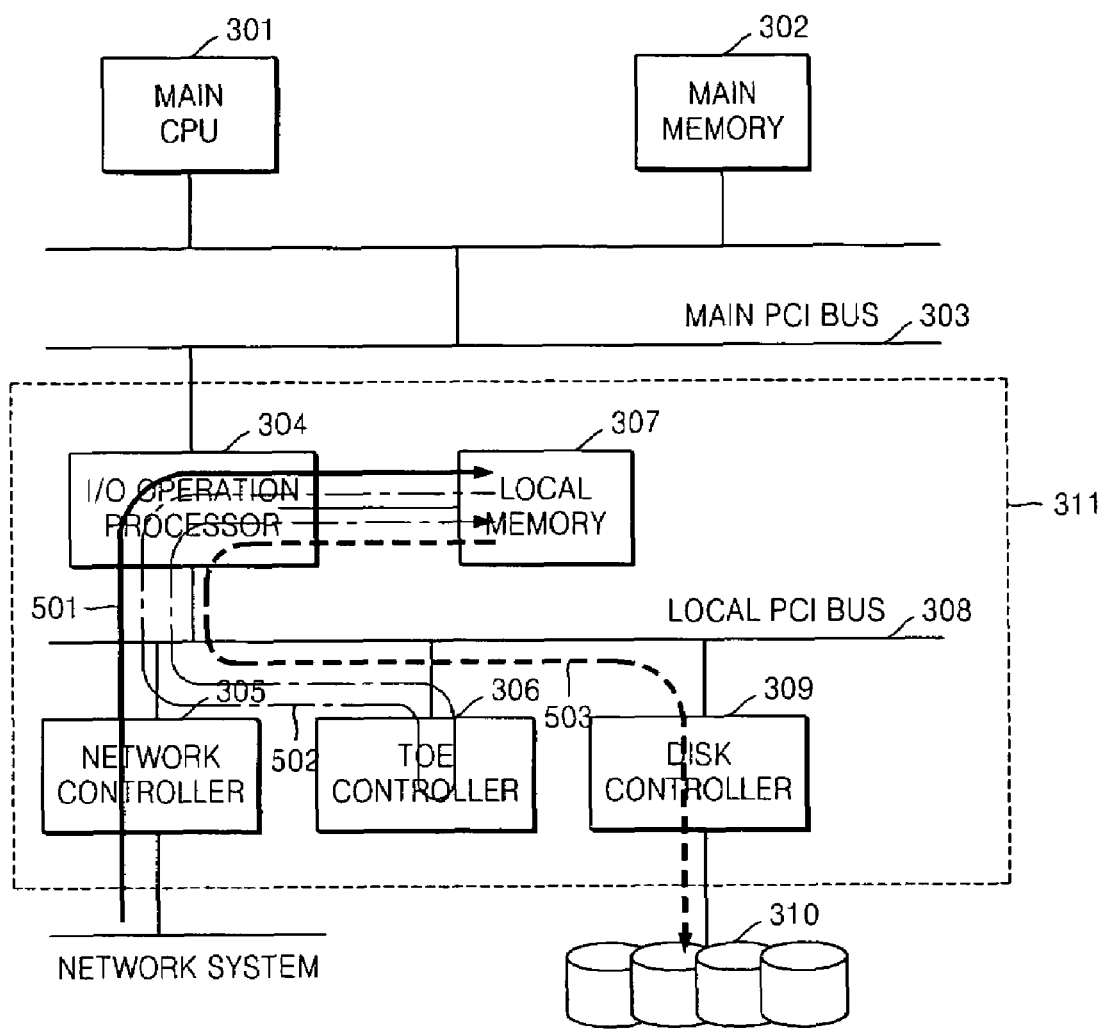
FIG. 5 is a diagram showing a data transfer path when a write command is executed on the iSCSI target system of FIG. 3.

FIG. 5 is a diagram showing a data transfer path when a write command is executed on the iSCSI target system of FIG. 3. When a write command is given to the iSCSI target system, the target system receives data from the network system and stores the data in the disk storage device 310 connected to the iSCSI target system, thus completing the write command.

In detail, referring to FIG. 5, the network controller 305, along a flow path 501, stores data that is transmitted after performing the TCP/IP/UDP checksum and the scatter/gather functions, in the local memory 307 connected to the I/O operation processor 304. Next, the TOE controller 306, along a flow path 502, reads the data stored in the local memory 307 connected to the I/O operation processor 304, offloads all of the TCP/IP stack without interference of the main CPU 301, and stores the data in the local memory 307 connected to the I/O operation processor 304. Finally, along a flow path 503, the disk controller 309 stores the offloaded data on the disk storage device 310.

Figure 6:
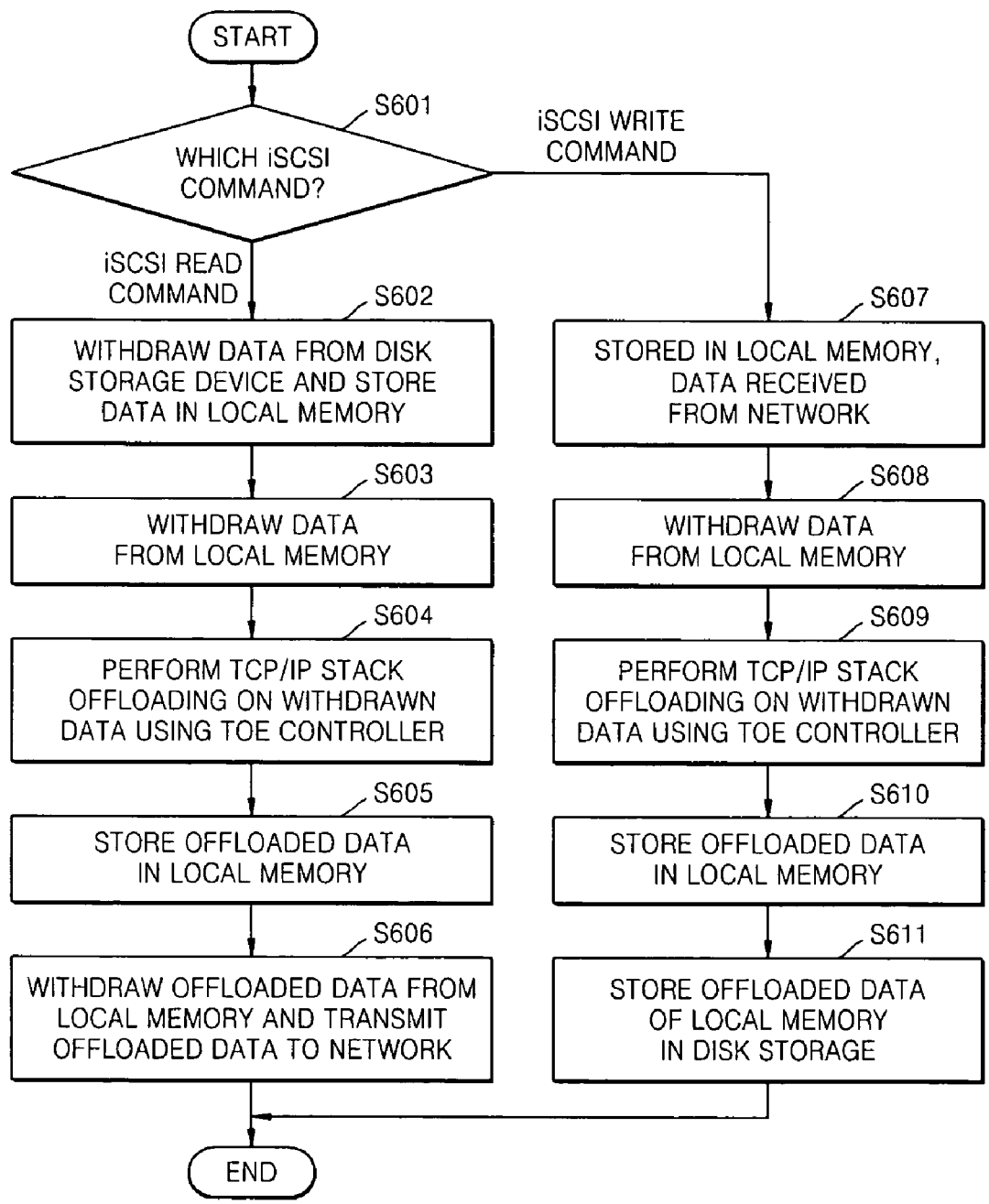
FIG. 6 is a flow chart for explaining a method for executing a read/write command on an iSCSI target system according to an embodiment of the present invention.

FIG. 6 is a flow chart for explaining a method for executing a read/write command on an iSCSI target system according to an embodiment of the present invention. That is, FIG. 6 shows a method for handling data with respect to an iSCSI read/write command along with the data transfer paths shown in FIGS. 4 and 5.

Referring to FIG. 6, the iSCSI target system checks what an iSCSI command received from the iSCSI initiator 201 of FIG. 2 is (S601). When the command is a read command, data to be read is withdrawn from the disk storage device 310 and stored in the local memory 307 (S602). The stored data is withdrawn from the local memory 307 (S603). The TOE controller 306 performs TCP/IP stack offloading of the withdrawn data (S604). Next, the offloaded data is stored in the local memory 307 (S605). Finally, the offloaded data is withdrawn from the local memory 307 and transmitted to the network system (S606).

When the command is a write command, the data transmitted from the network system is stored in the local memory 307 (S607). The stored data is withdrawn from the local memory 307 (S608). The TOE controller 306 performs TCP/IP stack offloading of the withdrawn data (S609). Next, the offloaded data is stored in the local memory 307 (S610). Finally, the offloaded data is withdrawn from the local memory 307 and stored in the disk storage device 310 (S611).

The function performed by each of the constituent elements to reduce the load on the main CPU 301 is shown below in detail. During the execution of the read command, when the read data is transmitted to the network system in the operation S606 of FIG. 6, the scatter/gather functions and the TCP/IP/UDP checksum offloading function are implemented. Also, for the data in the local memory 307, the zero-copy function to transmit the data to the network system without the copying between memories is performed.

In the operations S604 and S609 of FIG. 6, the TOE controller 306 reads the data from the local memory 307 and processes the data by directly controlling the MAC so that all of the TCP/IP stack can be offloaded without interfering with the main CPU 301. In the RAID system of the disk storage device 310 having a plurality of disks, for stable data storage and performance improvement, the dedicated XOR engine is used for the embodiment of an XOR operation or the calculation of parity.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While this invention has been particularly shown and described with reference to preferred embodiments thereof, it will be understood by those skilled in the art that various changes in form and details may be made therein without departing from the spirit and scope of the invention as defined by the appended claims.

As described above, when the hardware acceleration apparatus for an iSCSI target system using a TOE according to the present invention is used, the hardware performance is improved in the processing of a TCP/IP protocol, a RAID function is supported, and the checking of a parity can be performed by offloading the TCP/IP stack which is a bottle neck in the embodiment of the iSCSI target system. Thus, the load of the main CPU is reduced and data can be input and output at high speed.

Also, since the number of incidences of copying between memories is minimized during the processing of the iSCSI protocol, the bottle neck phenomenon which may occur in a PCI bus is removed so that the data processing speed is increased.

What is claimed is:

1. A hardware acceleration apparatus for an iSCSI (internet small computer system interface) target system having a main CPU (central processing unit), the apparatus comprising:
   a local memory storing data transmitted between a disk storage device and a network system;
   a TOE (TCP/IP offload engine) controller performing offloading of a TCP/IP (transmission control protocol/internet protocol) stacked on a TCP/IP packet of data stored in the local memory without interfering with the main CPU,
   wherein the main CPU is not required to generate a command to interface the TOE controller for performing the offloading;
   a network controller allowing data offloaded from the local memory to be transmitted to the network system using an iSCSI protocol or allowing data received from the network system to be stored in the local memory; and
   a disk controller storing and withdrawing data between the disk storage device and the local memory.

2. The hardware acceleration apparatus of claim 1, further comprising:
   an I/O operation processor controlling data input/output to/from the local memory; and
   a local bus connecting the respective constituent elements to serve as a data transfer path.

3. The hardware acceleration apparatus of claim 2, wherein the local bus is a PCI bus.

4. The hardware acceleration apparatus of claim 2, wherein the I/O operation processor performs an XOR operation for distributed processing of the data and a parity operation of an iSOSI protocol in a plurality of disk storage devices using an XOR engine.

5. The hardware acceleration apparatus of claim 1, wherein the network controller uses a scatter/gather function to transmit the data even when an IP header, a TCP header, a UDP (user datagram protocol) header, and a payload are not consecutively stored in the local memory during the transmission of the data and uses a TCP/IP/UDP checksum offloading function to process a checksum calculation performed on a TCP, IP or UDP layer, instead of a CPU.

6. The hardware acceleration apparatus of claim 1, wherein the TOE controller performs TCP/IP offloading by controlling MAC (media access control) in a physical layer of a network without interfering with the main CPU, and the network controller implements a zero-copy function to directly transmit the data through the local memory without a step of copying the data to another memory.

7. A method for performing a read command for an iSCSI target system having a main CPU (central processing unit), the method comprising:
   withdrawing data to be read from a disk storage device and storing the withdrawn data in a local memory;
   performing TCP/IP stack offloading on a TCP/IP packet of the stored data without interfering with the main CPU, wherein the main CPU is not required to generate a command to interface the TOE controller for performing the offloading; and transmitting the offloaded data to a network system.

8. The method of claim 7, wherein the performing of TCP/IP stack offloading comprises:

withdrawing the stored data from the local memory;

performing TCP/IP stack offloading on a TCP/IP packet of the withdrawn data using a TOE controller; and storing the offloaded data in the local memory.

9. The method of claim 8, wherein in the performing of TCP/IP stack offloading the TOE controller performs TCP/IP stack offloading by controlling a MAC in a physical layer on the network without interfering with the main CPU and performing TCP/IP stack offloading on a TCP/IP packet of the withdrawn data.

10. The method of claim 9, wherein the transmitting of the offloaded data to a network system uses at least one of a scatter/gather function to transmit data even when an IP header, a TCP header, a UDP header, and a payload are not consecutively stored in the local memory during the transmission of the data, a TCP/IP/UDP checksum offloading function to process checksum calculations performed on a TCP, IP or UDP layer, instead of a CPU, and a zero-copy function to directly transmit the data to the local memory without a step of copying the data in another memory.

11. A method for performing a write command for an iSCSI target system having a main CPU (central processing unit), the method comprising:

storing data received from a network system in a local memory;

performing TCP/IP stack offloading on a TCP/IP packet of the stored data without interfering with the main CPU, wherein the main CPU is not required to generate a command to interface the TOE controller for performing the offloading; and storing the offloaded data in a disk storage device.

12. The method of claim 11, wherein the performing of TCP/IP stack offloading comprises:

withdrawing the data from the local memory;

performing TCP/IP stack offloading on a TCP/IP packet of the withdrawn data using a TOE controller; and storing the offloaded data in the local memory.

13. The method of claim 12, wherein in the storing of the offloaded data in a disk storage device, during the storing of data, an XOR operation for distributed processing of the data and a parity operation of an iSCSI protocol in a plurality of disk storage devices using an XOR engine are implemented.

* * * * *